(12) United States Patent
Kitahara (10) Patent No.: US 7,702,287 B2
(45) Date of Patent: Apr. 20, 2010

(54) COMMUNICATION DEVICE, CALIBRATION METHOD, AND PROGRAM

(75) Inventor: Minako Kitahara, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 650 days.

(21) Appl. No.: 11/571,344

(22) PCT Filed: Jun. 22, 2005

(86) PCT No.: PCT/JP2005/011471

§ 371 (c)(1),
(2), (4) Date: Dec. 27, 2006

(87) PCT Pub. No.: WO2006/003826

PCT Pub. Date: Jan. 12, 2006

(65) Prior Publication Data

US 2007/0225042 A1    Sep. 27, 2007

(30) Foreign Application Priority Data

Jun. 30, 2004    (JP) .............................. 2004-195006

(51) Int. Cl.
*H04B 17/00* (2006.01)
(52) U.S. Cl. .................. 455/67.11; 455/562.1; 455/39; 455/277.1; 375/147; 370/208
(58) Field of Classification Search ............. 455/67.11, 455/562.1, 39, 277.1; 375/147, 347, 267; 370/208, 465
See application file for complete search history.

(56) References Cited

U.S. PATENT DOCUMENTS

| 5,173,700 | A | * | 12/1992 | Chesley | 342/17 |
| 5,218,295 | A | * | 6/1993 | Nakazato et al. | 324/207.24 |
| 5,832,032 | A | * | 11/1998 | Overbury | 375/285 |
| 6,590,860 | B1 | * | 7/2003 | Sakoda et al. | 370/203 |
| 6,735,182 | B1 | * | 5/2004 | Nishimori et al. | 370/294 |
| 6,765,529 | B2 | * | 7/2004 | Doi et al. | 342/368 |
| 6,952,455 | B1 | * | 10/2005 | Banister | 375/267 |
| 7,058,418 | B2 | * | 6/2006 | Doi et al. | 455/500 |
| 7,212,784 | B2 | * | 5/2007 | Doi et al. | 455/39 |
| 7,440,739 | B2 | * | 10/2008 | Yuanzhu | 455/273 |
| 7,471,694 | B2 | * | 12/2008 | Kent et al. | 370/464 |
| 7,483,675 | B2 | * | 1/2009 | Kent et al. | 455/67.11 |
| 2002/0098815 | A1 | * | 7/2002 | Hattori et al. | 455/138 |
| 2002/0155818 | A1 |  | 10/2002 | Boros et al. | 455/67.4 |

(Continued)

FOREIGN PATENT DOCUMENTS

EP    1 104 122 A1    5/2001

(Continued)

*Primary Examiner*—Minh D Dao
(74) *Attorney, Agent, or Firm*—Hogan & Hartson LLP (57) ABSTRACT

The present invention is characterized in that with the purpose to reduce influences of a calibration circuit on the calibration, a first calibration weight basic amount and a second calibration weight basic amount are calculated based on each of a calibration signal transmitted from a calibration unit (50) to a base station transmit-receive unit (40) via an antenna x unit (10-x) and a calibration signal transmitted from the base station transmit-receive unit (40) to the calibration unit (50) via the antenna x unit (10-x) respectively, and a calibration weight is calculated based on the first calibration weight basic amount and the second calibration weight basic amount.

5 Claims, 4 Drawing Sheets

U.S. PATENT DOCUMENTS

| | | | |
|---|---|---|---|
| 2003/0063694 A1* | 4/2003 | Goldberg et al. | 375/344 |
| 2003/0096638 A1* | 5/2003 | Doi et al. | 455/562 |
| 2004/0266360 A1* | 12/2004 | Hamalainen et al. | 455/67.16 |
| 2005/0219122 A1* | 10/2005 | Kawasaki | 342/378 |
| 2006/0072524 A1* | 4/2006 | Perahia et al. | 370/338 |
| 2006/0072682 A1* | 4/2006 | Kent et al. | 375/267 |
| 2006/0072683 A1* | 4/2006 | Kent et al. | 375/267 |
| 2006/0126571 A1* | 6/2006 | Yuanzhu | 370/335 |
| 2006/0209883 A1* | 9/2006 | Suzuki | 370/465 |
| 2007/0224942 A1* | 9/2007 | Kuramoto et al. | 455/67.11 |
| 2009/0161690 A1* | 6/2009 | Kent et al. | 370/464 |

FOREIGN PATENT DOCUMENTS

| | | |
|---|---|---|
| EP | 1 187 354 A1 | 3/2002 |
| JP | 2000-216618 | 8/2000 |
| JP | 2001-053661 | 2/2001 |
| WO | WO 95/34103 | 12/1995 |

\* cited by examiner

COMMUNICATION DEVICE, CALIBRATION METHOD, AND PROGRAM

TECHNICAL FIELD

The present invention relates to a communication apparatus, a calibration method, and a program.

BACKGROUND ART

A base station apparatus using an adaptive array antenna calculates a weight of transmission power for each of a plurality of antennas, for transmitted signals, based on signals received by each of the antennas. The base station apparatus transmits signals weighted according to the weight from each of the antennas.

For calculating the weight precisely, it is necessary to measure a received power and a phase rotation of a received signal by each antenna and a power loss and a delay which occur inside the base station apparatus on transmitting signals, and to calculate the weight in consideration of these measures. For this purpose, a variety of calibration technologies have been developed. For example, in Japanese Patent Application Publication No. 2001-053661, a calibration technique for calculating the weight in consideration of the power loss and the delay caused by different characteristics of isolation, loss, etc. between each antenna and between each cable is described.

DISCLOSURE OF THE INVENTION

Problems to be Solved by the Invention

Figure 5:
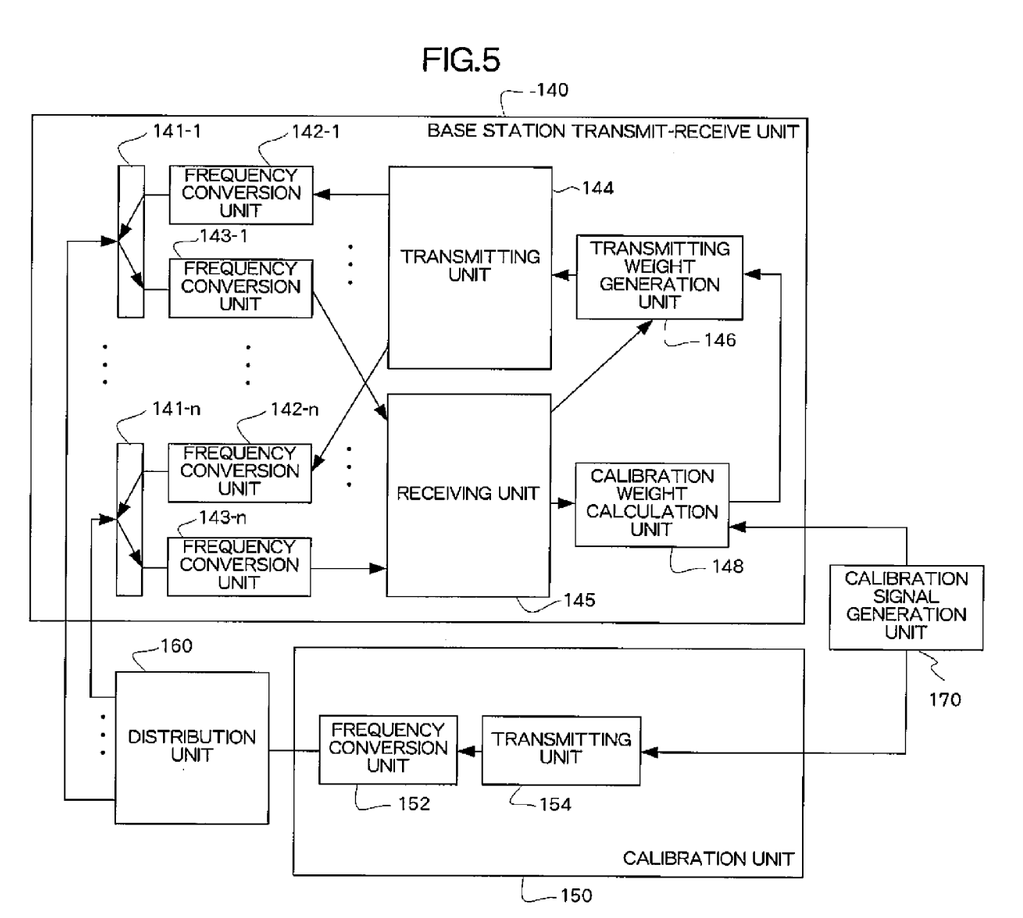
FIG. 5 is a functional block diagram of a base station apparatus related to a background technology of the present invention.

However, in the above conventional calibration technique, the characteristic of a calibration circuit influences the calibration. Conventionally, as shown in FIG. 5, a calibration signal transmitted from calibration unit 150 is received by base station transmit-receive unit 140, and calibration weight calculation unit 148 calculates a calibration weight based on the received signal. Hence, the characteristics of a cable extending from calibration unit 150 to base station transmit-receive unit 140 and such the circuit used for calibration as an internal circuit etc. influence the calibration weight. Therefore, in order to keep precision of calibration, the power loss and the delay in the circuit used for calibration need to be made equal between each antenna.

The present invention is proposed in consideration of the above problem. One of the purposes is to provide a communication apparatus, a calibration method, and a program which enable reduction of the influences of the calibration circuit on the calibration.

Means For Solving The Problems

In order to solve the above problem, a communication apparatus according to the present invention includes a calibration unit, a transmit-receive unit, and a plurality of antenna units coupled to each of the calibration unit and the transmit-receive unit, in which the communication apparatus further includes a calibration signal obtainer to obtain a calibration signal, the calibration unit includes a first transmitter to transmit the calibration signal obtained by the calibration signal obtainer to each of the antenna units, each of the antenna units includes a first obtainer/transmitter to obtain the calibration signal transmitted by the first transmitter and to transmit to the transmit-receive unit, the transmit-receive unit includes a first calibration weight basic amount calculator to calculate a first calibration weight basic amount based on the calibration signal transmitted by the first obtainer/transmitter and a second transmitter to transmit the calibration signal obtained by the calibration signal obtainer to each of the antenna units, each of the antenna units further includes a second obtainer/transmitter to obtain the calibration signal transmitted by the second transmitter to transmit to the calibration unit, the calibration unit further includes a second calibration weight basic amount calculator to calculate a second calibration weight basic amount based on the calibration signal transmitted by the second obtainer/transmitter and further includes a calibration weight calculator to calculate a calibration weight based on the first calibration weight basic amount and the second calibration weight basic amount.

By this combination, the calibration weight can be determined based on the first calibration weight basic amount and the second calibration weight basic amount. Therefore the influences of the calibration circuit on the calibration can be reduced.

In the above communication apparatus, the transmit-receive unit may include signal receivers, each installed in each of the plurality of antenna units and receiving signals arriving at each of the antenna units, a receiving weight calculator to calculate a plurality of receiving weights respectively corresponding to the antenna units, each of the receiving weights showing an amount of difference of phase and amplitude of signals, which are received by each of the signal receiver, between the antenna units; a transmitted signal obtainer to obtain a transmission signal; a transmitting weight determiner to determine transmitting weights respectively corresponding to the antenna units, each of the transmitting weights showing an amount of difference of phase and amplitude of the transmission signal, which is transmitted from each of the antenna units, between the antenna units based on each of the receiving weights and each calibration weight calculated by the calibration weight calculator; and a plurality of transmission signal transmitters, each installed in each of the plurality of antenna units and transmitting the transmission signal, which is weighted based on the transmitting weight determined by the transmitting weight determiner, from each of the antenna units.

As described above, by the combination in that in the communication apparatus including the plurality of antennas to transmit and receive radio signals, the plurality of signal receivers on the plurality of antennas, each receiving signals arriving at each of the antennas, the receiving weight calculator to calculate the plurality of receiving weights respectively corresponding to the antenna units, each of the receiving weights showing the amount of difference of phase and amplitude of signals, which are received by each of the signal receiver, between the antenna units, the transmitted signal obtainer to obtain the transmission signal, the transmitting weight determiner to determine transmitting weights respectively corresponding to the antennas, each of the transmitting weights showing the amount of difference of phase and amplitude of the transmission signal, which is transmitted from each of the antenna units, between the antennas based on each of the receiving weights and each calibration weight calculated by the calibration weight calculator, and the plurality of the transmission signal transmitter, each installed in each of the plurality of antennas and transmitting the transmission signal, which is weighted based on the transmitting weight determined by the transmitting weight determiner, from each of the antennas, the communication apparatus further includes the calibration signal obtainer to obtain the calibration signal and the calibration signal transmitter to transmit the calibration signal obtained by the calibration signal obtainer to each of the antennas, each of the signal receiver further receives the calibration signal transmitted by the calibration signal transmitter, the communication apparatus further includes the first calibration weight basic amount calculator to calculate the first calibration weight basic amount based on the calibration signal received by each of the signal receivers, the transmitted signal obtainer obtains the calibration signal obtained by the calibration signal obtainer as the transmission signal, the transmission signal transmitter transmits the calibration signal obtained by the transmission signal obtainer, the communication apparatus further includes the calibration signal receivers to receive each of the calibration signals transmitted by each of the calibration signal transmitters, the second calibration weight basic amount calculator to calculate the second calibration weight basic amount based on the calibration signal received by the calibration signal receiver, and the calibration weight calculator to calculate the calibration weight based on the first calibration weight basic amount and the second calibration weight basic amount, the transmitting weight determiner determines the transmitting weight on transmitting signals from each of the antenna units further based on the calibration weight, the calibration weight calculated by reducing the influences on calibration of the calibration circuit can be reflected in the transmitting weight on transmitting signals from each of the antenna units. Therefore, the transmitting weight with higher precision can be determined.

In the above communication apparatus, the first calibration weight basic amount may be calculated based on an amount of phase rotation and an amount of amplitude change of the calibration signal received by the transmit-receive unit from the calibration signal obtained by the calibration signal obtainer and the second calibration weight basic amount may be calculated based on an amount of phase rotation and an amount of amplitude change of the calibration signal received by the calibration unit from the calibration signal obtained by the calibration signal obtainer.

In the above communication apparatus, the calibration signal may be a signal with a constant frequency.

The calibration method according to the present invention is the calibration method for calculating a calibration weight of a communication apparatus including a calibration unit, a transmit-receive unit, and a plurality of antenna units coupled to each of the calibration unit and the transmit-receive unit, including a calibration signal obtaining step of obtaining a calibration signal, a first transmitting step of transmitting the calibration signal obtained in the calibration signal obtaining step to each of the antenna units in the calibration unit, a first obtaining/transmitting step of transmitting the calibration signal transmitted in the first transmitting step to the transmit-receive unit in each of the antenna units, a first calibration weight basic amount calculating step of calculating a first calibration weight basic amount based on the calibration signal transmitted in the first obtaining/transmitting step and a second transmitting step of transmitting the calibration signal obtained in the calibration signal obtaining step to each of the antenna units in the transmit-receive unit, a second obtaining/transmitting step of transmitting the calibration signal transmitted in the second transmitting step to the calibration unit in each of the antenna units, a second calibration weight basic amount calculating step of calculating a second calibration weight basic amount based on the calibration signal transmitted in the second obtaining/transmitting step in the calibration unit, and a calibration weight calculating step of calculating a calibration weight based on the first calibration weight basic amount and the second calibration weight basic amount.

A program according to the present invention is the program for making a computer function as a communication apparatus including a calibration unit, a transmit-receive unit, and a plurality of antenna units coupled to each of the calibration unit and the transmit-receive unit, wherein the program further makes the computer function as the communication apparatus having the calibration signal obtainer to obtain the calibration signal, the program further makes the computer function as the calibration unit having a first transmitter to transmit the calibration signal obtained by the calibration signal obtainer to each of the antenna units, the program further makes the computer function as each of the antenna units having a first obtainer/transmitter to transmit the calibration signal transmitted by the first transmitter to the transmit-receive unit, the program makes the computer function as the transmit-receive unit having a first calibration weight basic amount calculator to calculate a first calibration weight basic amount based on the calibration signal transmitted by the first obtainer/transmitter and a second transmitter to transmit the calibration signal obtained by the calibration signal obtainer to each of the antenna units, the program further makes the computer function as each of the antenna units having a second obtainer/transmitter to transmit the calibration signal transmitted by the second transmitter to the calibration unit, and the program further makes the computer function as the calibration unit having a second calibration weight basic amount calculator to calculate a second calibration weight basic amount based on the calibration signal transmitted by the second obtainer/transmitter, the program further makes the computer function as the communication apparatus having a calibration weight calculator to calculate a calibration weight based on the first calibration weight basic amount and the second calibration weight basic amount.

BEST MODE FOR CARRYING OUT THE INVENTION

Embodiments of the present invention are described below referring to drawings.

Figure 1:
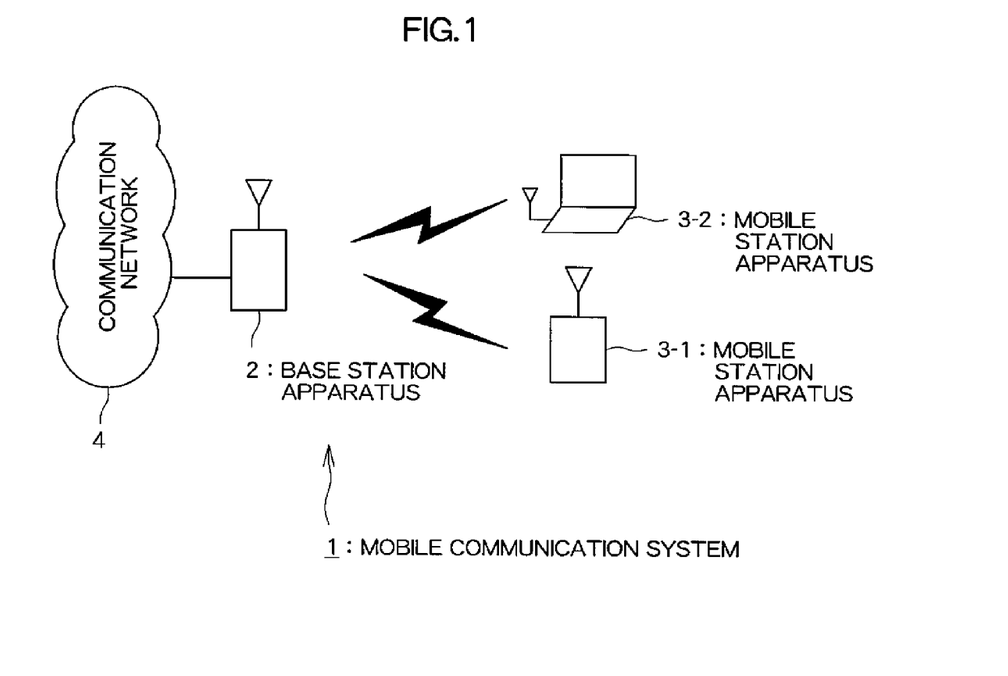
FIG. 1 is a configuration diagram of a mobile communication system according to an embodiment of the present invention.

FIG. 1 is a configuration diagram of a mobile communication system 1 according to an embodiment of the present invention. As shown in FIG. 1, the mobile communication system 1 includes a base station apparatus 2, mobile station apparatuses 3, and a communication network 4.

Figure 2:
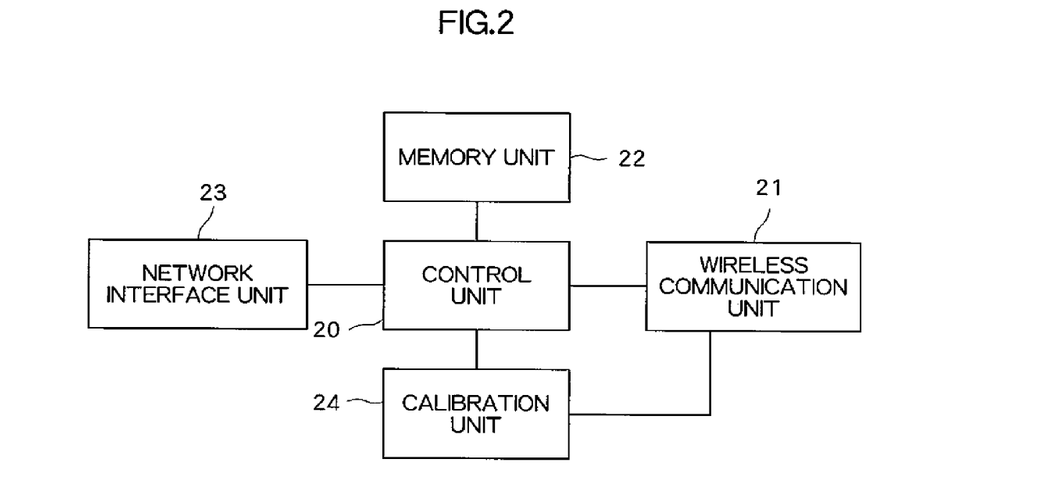
FIG. 2 is a configuration block diagram of a base station apparatus according to an embodiment of the present invention.

As shown in FIG. 2, the base station apparatus 2 includes a control unit 20, a wireless communication unit 21, a memory unit 22, a network interface unit 23, and a calibration unit 24. The control unit 20 controls each section of the base station apparatus 2 and executes processes concerning telephone calls and data communications. The wireless communication unit 21, which has a plurality of antennas, executes processes on receiving and demodulating each of audio signals, communication packets, etc. from the mobile station apparatus 3 and then outputting to the control unit 20, and modulating audio signals and communication packets inputted from the control unit 20 and then outputting through the antennas according to instructions inputted from the control unit 20. It executes communications by Space Division Multiple Access (SDMA) described later using the plurality of antennas as conventionally well-known an adaptive array antenna. The memory unit 22 works as a work memory for the control unit 20. In addition, this memory unit 22 holds programs and parameters concerning various processes executed by the control unit 20. The network interface unit 23, which is connected to the communications network 4, receives audio signals and communication packets from the communications network 4 and outputs to the control unit 20, and sends the audio signals and the communication packets to the communications network 4 according to instructions of control unit 20. The calibration unit 24 executes, as described later, sending and receiving a calibration signal and executes partially calibration processes for reflecting a power loss and a delay in the base station apparatus 2 on a weight of transmission power for each of the antennas.

The mobile station apparatus 3 is a terminal device similar to a terminal apparatus used for a mobile communication system such as a conventionally well-known mobile phone terminal, a PHS terminal, etc. The apparatus 3 communicates with the base station apparatus 2 by receiving radio signals transmitted from the base station apparatus 2 and transmitting radio signals to the base station apparatus 2. And, the communications are operated by using the above Space Division Multiple Access and Time Division Duplex (TDD), so the same frequency channel is used for signals sent from the mobile station apparatus 3 to the base station apparatus 2 (uplink signal) and signals sent from the base station apparatus 2 to the mobile station apparatus 3 (downlink signal).

The communication network 4 may be an exchanger network of the mobile communication system 1 or TCP/IP network in the case where the mobile communication system 1 is a communication system adopting IP phone.

Figure 3:
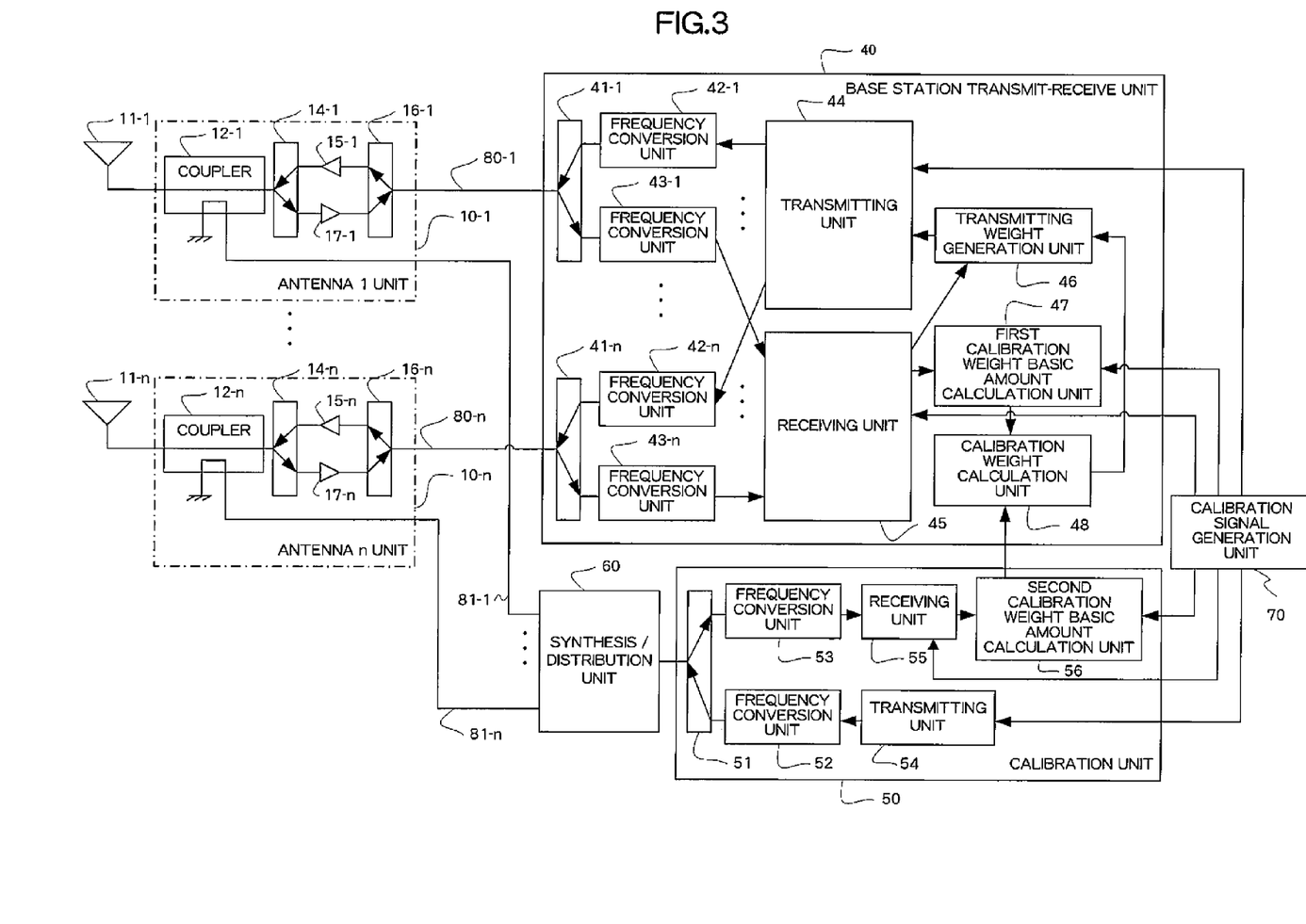
FIG. 3 is a functional block diagram of a base station apparatus according to the embodiment of the present invention.

FIG. 3 is a configuration block diagram of the base station apparatus 2 according to the embodiment of the present invention. As shown in FIG. 3, the base station apparatus 2 functionally includes an antenna x unit 10-x (x=1 to n), a base station transmit-receive unit 40, a calibration unit 50, a synthesis/distribution unit 60, a calibration signal generation unit 70, a cable 80-x (x=1 to n), and cable 81-x (x=1 to n). The antenna x unit 10-x includes an antenna 1-x, a coupler 12-x, a Transmit/Receive (T/R) switch 14-x, a power amplifier 15-x, a T/R switch 16-x, and a low noise amplifier 17-x. The base station transmit-receive unit 40 includes a T/R switch 41-x (x=1 to n), a frequency conversion unit 42-x (x=1 to n), a frequency conversion unit 43-x (x=1 to n), a transmitting unit 44, a receiving unit 45, a transmitting weight generation unit 46, a first calibration weight basic amount calculation unit 47, and a calibration weight calculation unit 48. The calibration unit 50 includes a T/R switch 51, a frequency conversion unit 52, a frequency conversion unit 53, a transmitting unit 54, a receiving unit 55, and a second calibration weight basic amount calculation unit 56.

The antenna x unit 10-x is achieved by the wireless communication unit 21, obtains a radio wave arrived at the antenna 11-x, and executes signal inputting process to input the signal contained in the radio waves to the base station transmit-receive unit 40 and signal sending process to send the signals which is outputted from the base station transmit-receive unit 40, from the antenna 11-x to a radio zone. And, normally, the antenna x unit 10-x transmits and receives radio waves between the mobile station apparatus 3.

In addition, the antenna x unit 10-x amplifies the signal contained in the radio wave arrived at the antenna 11-x and amplifies the signal outputted from the base station transmit-receive unit 40. Concretely, the above Time Division Duplex is used in the embodiments of the present invention. The antenna x unit 10-x achieves Time Division Duplex by distributing each of the signals contained in time slots of the uplink signal and the downlink signal in different routes by the T/R switch 14-x and the T/R switch 16-x to operate communications via the amplifier installed in each route. In case of the uplink signal, the transmission power for sending the signal from the antenna 11-x is controlled by amplifying the signal power by the power amplifier 15-x. On the other hand, In case of the downlink signal, very low noise level amplification is operated the by low noise amplifier 17-x to amplify the power of received signals without increasing the noise level of the received signals as possible. The coupler 2-x is described later.

The antenna X unit 10-x is installed in a top of a steel tower, on which the base station apparatus 2 is normally mounted. The base station transmit-receive unit 40 is installed in the part of the steel tower, which is located near the ground. Therefore, frequently, there is a distance of 10 or more meters between the T/R switch 16-x and the T/R switch 41-x connected with cable 80-x.

The base station transmit-receive unit 40 is achieved by the control unit 20, the wireless communication unit 21, and the memory unit 22 and executes demodulation and decode process to demodulate and decode the signal outputted from antenna x unit 10-x and executes modulation and encoding process to modulate and encode the signal outputted to antenna x unit 10-x. Further, not shown in figures, the base station transmit-receive unit 40 sends and receives the signal between itself and the network interface unit 23 and relays communications between the communications network 4 and the mobile station apparatus 3.

The T/R switch 41-x is connected to the cable 80-x, outputs the signal, which is outputted from the antenna x unit 10-x to the frequency conversion unit 43-x by switching the route for the time slot containing the signal outputted from the antenna x unit 10-x and the time slot containing the signal outputted to the antenna x unit 10-x and sends out the signal outputted from the frequency conversion unit 42-x to the cable 80-x. The T/R switch 41-x, the frequency conversion unit 42-x, and the frequency conversion unit 43-x are each installed corresponding to the antenna x unit 10-x and inputs and outputs the signal between each antenna x unit 10-x.

The frequency conversion unit 43-x executes frequency conversion process to convert the signal outputted from the antenna x unit 10-x from the radio frequency to a baseband frequency and outputs to the receiving unit 45. On the contrary, the frequency conversion unit 42-x executes frequency conversion process to convert the signal outputted to the antenna x unit 10-x from the baseband frequency to the radio frequency and sends out the signal to the T/R switch 41-x.

The receiving unit 45 executes synthesis and detection process of the signal inputted from the frequency conversion unit 43-x.

This detection processing is described below. The receiving unit 45 extracts only a component of a specific frequency by subjecting the inputted signal to DFT (Digital Fourier Transpose) process by a band path filter not shown in figures. Then, the receiving unit 45 operates demodulation and decoding process to the signal of the specific frequency and obtains the signal sent out by the mobile station apparatus 3 as a bit string. The detection process is executed as described above.

Moreover, the receiving unit 45 obtains phases and amplitudes of the signal inputted from the frequency conversion unit 43-x to output to the transmitting weight generation unit 46.

The transmitting unit 44 executes encoding and modulation process of the signal to send out the bit string which is the signal outputted from the network interface unit 23 to the radio zone. Then, the transmitting unit 44 outputs the signal to the frequency conversion unit 42-x. At operating this outputting, the transmitting unit 44 weights each output to the frequency conversion unit 42-x according to a transmitting weight generated in the transmitting weight generation unit 46 described later. More Concretely, the transmitting unit 44 multiplies the modulated signal by a transmitting weight showing the amount of difference of the phase and the amplitude of the signal, which is generated in the transmitting weight generation unit 46, between each antenna x unit 10-x to determine the phase and the amplitude for each antenna x unit 10-x, when the signal is transmitted to the radio zone from each antenna x unit 10-x. By this way, adaptive beam forming and adaptive null steering, namely, Space Division Multiple Access, are achieved by using the antenna 11-x. The number n of x is the number of the adaptive array antennas. The processing is expressed by the following formula (1). Here, the modulated signal is defined as s(t), the signal outputted to the frequency conversion unit 42-x is defined as $s_x(t)$, a sending weight for the $s_x(t)$ is defined as $w_{Tx}$.

$$s_x(t)=S(t) \times w_{Tx}(x=1,2,\ldots,n) \quad (1)$$

The transmitting weight generation unit 46 calculates the receiving weight showing the amount of difference in the phase and the amplitude of the received signal between each of the antenna x units 10-x according to the phase and the amplitude of the signal outputted from the receiving unit 45. The receiving weight is relative and, thus, the difference between the reference phase and amplitude and the other phases and amplitudes of signals outputted from the other frequency conversion unit 43-x can be used as the receiving weight in the antenna x unit 10-x with the reference to the phase and the amplitude of the signal outputted from the frequency conversion unit 43-x of the mobile communication system 1. Then, the transmitting weight generation unit 46 generates transmitting weight $w_{tx}$ according to the receiving weight and each of a plurality of calibration weights which is calculated by the calibration weight calculation unit 48 described later and corresponds to each of the antenna x units 10-x. The processing is expressed by the following formula (2). Here, the receiving weight of the signal outputted from the frequency conversion unit 43-x is defined as $w_{cx}$ and the calibration weight is defined as $w_{Cx}$.

$$w_{Tx}=w_{Rxx}w_{Cx}(w=1,2,\ldots,n) \quad (2)$$

Next, process of calculation of calibration weights is described below.

The calibration signal generation unit 70 is achieved by the control unit 20 generates the calibration signal. The kinds of the calibration signal include, for example, a tone signal (sinusoidal wave) being a species of the signal of the constant frequency and a burst signal (bit string), of which frequency is changed according to a content of the signal. When the tone signal is used, the tone signal is prepared with a fixed symbol and the fixed symbol is repeatedly copied to enable to generate the calibration signal. When the burst signal is used, using PN code (Pseudo Noise) and generating the signal from random numbers allows generating the calibration signal. The calibration signal generation unit 70 outputs the generated signal to the transmitting unit 44, the receiving unit 45, the transmitting unit 54, the receiving unit 55, the first calibration weight basic amount calculation unit 47, and the second calibration weight basic amount calculation unit 56.

The calibration unit 50 is achieved by the calibration unit 24. In the calibration unit 50, first, the transmitting unit 54 obtains the calibration signal inputted from the calibration signal generation unit 70. Furthermore, the transmitting unit 54 operates encoding and modulating process in accordance with the kind of the calibration signal to output the calibration signal to the frequency conversion unit 52.

The frequency conversion unit 52 converts the calibration signal from the base band frequency to the radio frequency to output to the T/R switch 51. The T/R switch 51 switches the routes for the time slot containing the signal outputted from the synthesis/distribution unit 60 and the time slot containing the signal to output to the synthesis/distribution unit 60 to output the signal outputted from the synthesis/distribution unit 60 to the frequency conversion unit 53 and to send out the signal outputted from the frequency conversion unit 52 to the synthesis/distribution unit 60.

The synthesis/distribution unit 60 is connected to the cable 81-n and transmits by distributing the calibration signal outputted from the T/R switch 51 to the coupler 12-n of each of the antenna x units 10-x. The synthesis/distribution unit 60 may be contained in the calibration unit 24 or contained in the wireless communication unit 21. When it is contained in the wireless communication unit 21, the distance between the T/R switch 51 and the synthesis/distribution unit 60 becomes equal in length to the distance between the T/R switch 16-x and the T/R switch 41-x. When it is contained in the calibration unit 24, the distance between the synthesis/distribution unit 60 and the coupler 12-x becomes equal in length to the distance between the T/R switch 16-x and the T/R switch 41-x.

The coupler 12-x connects electrically a communication wire installed between the T/R switch 14-x and the antenna 11-x to the cable 81-x. Then, by the coupler 12-x the signal flowing in the communication wire, which is installed between the T/R switch 14-x and the antenna 11-x, also flows in the cable 81-x. On the contrary, the signal flowing in the cable 81-x also flows in the communication wire installed between the T/R switch 14-x and the antenna 11-n. Consequently, for example, the signal flowing from the T/R switch 14-x to the antenna 11-x is obtained by the coupler 12-x to be flown in the cable 81-x and, therefore, can be obtained by the synthesis/distribution unit 60. The signal flown from the synthesis/distribution unit 60 to the cable 81-x obtained by the coupler 12-x is also flown in the communication wire installed between the T/R switch 14-x and the antenna 11-x and, therefore, can be obtained by the T/R switch 14-x.

As described above, the T/R switch 14-x obtains the calibration signal distributed and sent by the synthesis/distribution unit 60. The calibration signal is sent by adjusting the time in the calibration unit 50 to be put in the time slot used for the uplink signal of Time Division Duplex. For this purpose, using a clock not shown in figures is preferable to make synchronization between the control unit 20, the wireless communication unit 21, the memory unit 22, and the calibration unit 24.

The plurality of the calibration signal obtained by the T/R switch 14-x in such the way is detected in the receiving unit 45 by the process described above. In detection process, when the calibration signal is the tone signal, subjecting the signal outputted from the frequency conversion unit 43-x to DFT process allows obtaining an original tone signal.

On the other hand, when the calibration signal is the burst signal, the receiving unit 45 uses the calibration signal inputted from the calibration signal generation unit 70 as a reference signal to execute demodulation and decoding from a correlation with the reference signal. Concretely, the detection is operated by searching a timing, in which the correlation becomes maximum between the signal outputted from the frequency conversion unit 43-x and at least a part of the reference signal to obtain and output the correlation between the reference signal and the signal outputted from the frequency conversion unit 43-x in the timing to make the correlation maximum. Namely, the receiving unit 45 operates a carrier component extraction process to extract a carrier component from the signal outputted from the frequency conversion unit 43-x to match to the frequency and the phase of a transmission side. Such the carrier component extraction process is unnecessary for the case where the calibration signal is the tone signal.

In addition, based on the calibration signal received by the receiving unit 45, the first calibration weight basic amount calculation unit 47 calculates a first calibration weight basic amount. The first calibration weight basic amount is the amount used for calibration weight calculation process in the calibration weight calculation unit 48 described later and calculated based on the phase rotation amount and the amplitude change amount of the calibration signal, which is received by the base station transmit-receive unit 40, to the calibration signal obtained by the calibration signal generation unit 70. Concretely, if it is defined that the calibration signal generated by the calibration signal generation unit 70 is $C_x(t)$, the signal outputted from the frequency conversion unit 43-x is $C'_x(t)$, the power loss and the phase rotation in the route from the calibration unit 50 to the synthesis/distribution unit 60 are B and $\beta$, respectively, the power loss and the phase rotation in the cable 81-x are $D_x$ and $\delta_x$, respectively, the power loss and the phase rotation in the route from the antenna x units 10-x to the receiving unit 45 are Ex and $\epsilon_x$, respectively, the first calibration weight basic amount is Er(x), and noise is $N_{1x}$, $C'_x(t)$ and Er(x) are expressed by the following formulas (3) and (4), respectively. E[ ] is a function having a mean value, * is complex conjugate, and x is an integral from 1 to n. The amplitude of $C_x(t)$ is assumed to be 1. Finally, j is imaginary unit.

$$C'_x(t)=C_x(t)\times B\exp(j\beta)\times D_x\exp(j\delta_x)\times E\exp(j\epsilon_x)+N_{1x} \quad (3)$$

$$Er(x)=E[C'_x(t)]\times C_x(t)^*=BD_xE_x\exp(j(\beta+\delta_x+\epsilon_x)) \quad (4)$$

Next, the transmitting unit 44 obtains the calibration signal from inputted from the calibration signal generation unit 70. Then, for the obtained calibration signal, the transmitting unit 44 operates encoding and modulation process according to the species of calibration signals and outputs to the frequency conversion unit 42-x. At this time, it is preferable that the transmitting unit 44 outputs the calibration signal to only a specific frequency conversion unit 42-x. Concretely, making the transmitting weight of the signal outputted to other unit than the specific frequency conversion unit 42-x zero allows outputting the calibration signal to only the specific frequency conversion unit 42-x by the transmitting unit 44. Below, the description is made on the assumption that the calibration signal is outputted to only frequency conversion unit 42-i.

The frequency conversion unit 42-i convert the calibration signal from the base band frequency to the radio frequency to output to the T/R switch 14-i. Then, by the process described above, the antenna i unit 10-i sends the signal from the antenna unit 11-i. At this time, the signal flowing from the T/R switch 14-i to the antenna unit 11-i is obtained by the coupler 12-i to flow to the cable 811 and, thus, becomes possible to be obtained in the synthesis/distribution unit 60.

By such the way, the synthesis/distribution unit 60 obtains the calibration signal. Then, the calibration signal is outputted to the T/R switch 51. The T/R switch 51 outputs the calibration signal to the frequency conversion unit 53. The frequency conversion unit 53 operates frequency conversion process to convert the calibration signal from the radio frequency to the baseband frequency. The frequency conversion unit 53 outputs the calibration signal, which is subjected to frequency conversion processing, to the receiving unit 55 and the receiving unit 55 detects the calibration signal. In the detection, when the calibration signal is the tone signal, the phase component of the original tone signal is extracted by subjecting the signal outputted from the frequency conversion unit 53 to DFT process.

On the other hand, when the calibration signal is the burst signal, the receiving unit 45 uses the calibration signal inputted from the calibration signal generation unit 70 as the reference signal to execute demodulation and decoding from the correlation with the reference signal. Concretely, the receiving unit 55 operates detection by searching the timing, in which the correlation becomes maximum between the signal outputted from the frequency conversion unit 53 and at least a part of the reference signal to obtain and output the correlation between the reference signal and the signal outputted from the frequency conversion unit 53 in the timing to make the correlation maximum.

Moreover, based on the calibration signal received by receiving unit 55, the second calibration weight basic amount calculation unit 56 calculates a second calibration weight basic amount. The second calibration weight basic amount, similar to the first calibration weight basic amount, is the amount used for calibration weight calculation process in the calibration weight calculation unit 48 described later and calculated based on the phase rotation amount and the amplitude change amount of the calibration signal received by the calibration unit 50 to the calibration signal obtained by the calibration signal generation unit 70. Concretely, if it is defined that the calibration signal generated by the calibration signal generation unit 70 is $C_i(t)$, the signal outputted from the frequency conversion unit 53 is $C'_i(t)$, the power loss and the phase rotation in the route from the transmitting unit 44 to the antenna i unit 10-i are $F_i$ and $\zeta_i$, respectively, the power loss and the phase rotation in the cable 81-i are $G_i$ and $\eta_i$, respectively, the power loss and the phase rotation in the route from the synthesis/distribution unit 60 to the calibration unit 50 are H and $\kappa$, respectively, the second calibration weight basic amount is Et(i), and noise is N2i, $C'_i(t)$ and Et(i) are expressed by the following formulas (5) and (6), respectively. The amplitude of $C_i(t)$ is assumed to be 1.

$$C'_i(t)=C_i(t)\times F_i\exp(j\zeta_i)\times G_i\exp(j\eta_i)\times H\exp(j\kappa)+N_{2i} \quad (5)$$

$$Et(i)=E[C'_i(t)]\times C_i(t)^*=F_iG_iH\exp(j(\zeta_i+\eta_i+\kappa)) \quad (6)$$

The first calibration weight basic amount and the second calibration weight basic amount, which are obtained by such the way, are outputted to the calibration weight calculation unit 48 by the first calibration weight basic amount calculation unit 48 and the second calibration weight basic amount calculation unit 56, respectively. The first calibration weight basic amount calculation unit 48 calculates a plurality of the first calibration weight basic amount corresponding to each of the antenna x units 10-x by receiving once the calibration signal and outputs to the calibration weight calculation unit 48. On the other hand, the second calibration weight basic amount calculation unit 56 calculates the plurality of the second calibration weight basic amount corresponding to each of the antenna x units 10-x by receiving n-times the calibration signal and outputs to the calibration weight calculation unit 48 for every calculation. It may be natural that the calculated value is stored in a memory and, at the time of finishing the calculation of the second calibration weight basic amount corresponding to all of the antenna x units 10-x, outputted to the calibration weight calculation unit 48. Then, the calibration weight calculation unit 48 calculates the calibration weight based on the inputted first calibration weight basic amount and the inputted second calibration weight basic amount. Concretely, calibration weight $w_{Cx}$ is expressed by the following formula (7).

$$w_{Cx} = Er(x)/Et(x) = (BD_x E_x)/(F_x G_x H)\exp(j(\beta + \delta_x + \epsilon_x - \zeta_x - \eta_x - \kappa)) \quad (7)$$

Here, the power loss and the phase rotation in the cable 81-x are highly probably constant regardless of the direction of the signal flowing in the cable 81-x. Thus, $D_x$ and $\delta_x$ can be assumed as equal to $G_i$ and $\eta_i$, respectively. On the other hand, if it is assumed that the difference between the power loss and the phase rotation in the route from the calibration unit 50 to the synthesis/distribution unit 60 and the power loss and the phase rotation in the route from the synthesis/distribution unit 60 to the calibration unit 50 is negligibly small, B and p can be assumed as equal to H and K, respectively. By such definition, the following formula (8) is introduced from formula (7).

$$w_{Cx} = (E_x)/(F_x)\exp(j(\epsilon_x - \zeta_x)) \quad (8)$$

As described above, the calibration weight calculation unit 48 can, as expressed by formula (8), obtain the calibration weight, which is the original purpose of calibration, by only the power loss and the phase rotation in the route from the antenna x units 10-x to the base station transmit-receive unit 40.

Then, the calibration weight obtained by such the way is outputted from the calibration weight calculation unit 48 to the transmitting weight generation unit 46. Where, the transmitting weight generation unit 46 calculates transmitting weight $w_{Tx}$ as formula (9) by calculating applying formula (2). Where, the receiving weight is defined as $w_{Rx} = A_{Rx} \exp(j\alpha_{Rx})$ and x is defined as the integer between 1 to n.

$$w_{Tx} = w_{Rx} \times w_{Cx} = (A_{Rx} E_x)/(F_x)\exp(j(\alpha_{Rx} + \epsilon_x - \zeta_x)) \quad (9)$$

Next, based on formula (9) and formula (1), the signal $S_x(t)$ outputted from the transmitting unit 44 to the frequency conversion unit 42-x is expressed by the following formula (10).

$$S_x(t) = S(t) \times (A_{Rx} E_x)/(F_x)\exp(j(\alpha_{Rx} + \epsilon_x - \zeta_x)) \quad (10)$$

The transmission signal $ST_x(t)$ at transmitting $S_x(t)$, which is calculated by such the way is subjected to frequency conversion processing to transmit from the antenna 11-x, becomes the signal obtained by applying $F_i$ and $\zeta_i$ of the power loss and the phase rotation, respectively, in the route from the transmitting unit 44 to the antenna i unit 10-i to $Sx(t)$ and, hence, is expressed by the following formula (11).

$$ST_x(t) = S_x(t) \times F_i \exp(j\zeta_i) = S(t) \times A^{Rx} E_x \exp(j(\alpha_x \rightarrow \epsilon_x)) \quad (11)$$

Here, $E_x \exp(j(\epsilon_x))$ is the power loss and the phase rotation at receiving operation inside the base station apparatus 2 and, if the power loss and the phase rotation at are defined as $W_{Lx}$, formula (11) is rewritten as the following formula (12).

$$ST_x(t) = S(t) \times w_{Rx} \times w_{Lx} \quad (12)$$

Where, the receiving weight is defined as $w_{Rx} \times W_{Lx}$, the power loss and the phase rotation at the receiving operation inside the base station apparatus 2 reflect to the receiving weight. Namely, based on the amplitude and phase in the antenna 11-x, this operation is equal to the calculation of the receiving weight. By this, according to this embodiments, the transmitting weight can be determined reflecting both of the power loss and the phase rotation at the receiving operation inside the base station apparatus 2 and the power loss and the phase rotation at the transmitting operation inside the base station apparatus 2. Configuring that the calibration signal is transmitted and received between the base station transmit-receive unit 140 and the calibration unit 150 enables reduction of the influences of the calibration circuit on the calibration, according to calibration weight basic amount calculated for each of the uplink and down link. Further, extending the cable 81-x for sending and receiving calibration signal to the antenna x units 10-x and flowing the calibration signal mutually between the communication cable 80-x and the calibration cable 81-x by using the coupler 12-x enables to include the power loss and the phase rotation of the antenna x units 10-x and the cable 80-x in the calibration weight.

Figure 4:
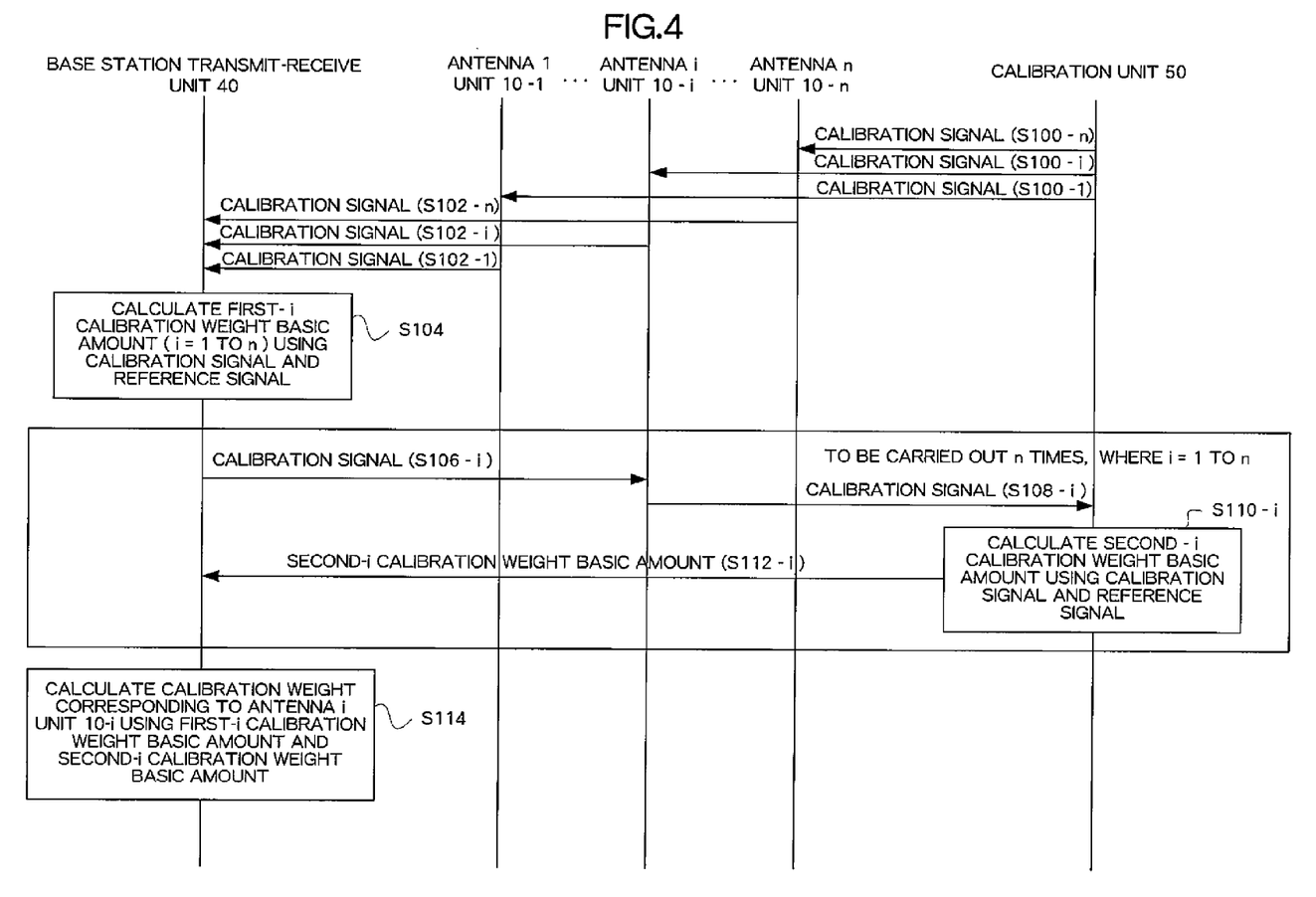
FIG. 4 is a sequence diagram of a base station apparatus according to the embodiment of the present invention.

Process for calculation of the calibration weight as described above is again described below in detail with reference to a process sequence diagram.

FIG. 4 is a sequence diagram of the process for testing the calibration weight. First of all, the calibration unit 50 sends the calibration signal generated by the calibration signal generation unit 70 to each of the antenna i units 10-i (S100-i) (i=1, 2, . . . n). Each of the antenna i units 10-i obtains by connecting the calibration signal to the communication route of the signal for communications using the coupler 12-i to send to the base station transmit-receive unit 40 (S102-i). Then, the base station transmit-receive unit 40 calculates a first-i calibration weight basic amount using the received signal and the calibration signal, which is generated by the calibration signal generation unit 70 and separately obtained, as the reference signal (S104).

Next, the base station transmit-receive unit 50 send the calibration signal, which is generated by the calibration signal generation unit 70, to antenna i units 10-i (S106-i). The antenna i units 10-i obtains the calibration signal by linking to the cable 81-i, which is the communication route between the base station transmit-receive unit 50 and the antenna i units 10-i, using the coupler 12-i to transmit to the calibration unit 50 (S108-i). Then, the calibration unit 50 calculates a second-i calibration weight basic amount using the received signal and the calibration signal, which is generated by the calibration signal generation unit 70 and separately obtained, as the reference signal (S110-i). Finally, the calculated second-i calibration weight basic amount is sent to the base station transmit-receive unit 40 (S112-i). Processes from S106-i to S112-i are repeated for i making i=1, 2, . . . , n.

The base station transmit-receive unit 40 calculates the calibration weight corresponding to antenna i units 10-i based on the calculated first calibration weight basic amount and the received second-i calibration weight basic amount (S114).

As described above, calculating calibration weights, which correspond to antenna i units 10-i, for all i's and multiplying by the transmitting weight, as described above, allow the base station apparatus 2 to operate calibration having a reduced influence by the circuit used for calibration.

The present invention is not restricted to the embodiments as described above. For example, any of process for calculating the first calibration weight basic amount or process for calculating the second calibration weight basic amount may be executed first and in parallel. On the other hand, it may be optional that when the first calibration weight basic amount calculation unit 47 calculates the first calibration weight basic amount, whether or not the signal received by the receiving unit 45 is the calibration signal is determined and, then, if the determination is affirmative, calculation is operated. The determination may be operated by knowing the content of the received signal. When the base station transmit-receive unit 40 and the calibration unit 50 receives the direction of operating calibration from the control unit 20, it may be determined that the signal received in the calibration signal transmission timing determined according to the direction is the calibration signal. On the other hand, the embodiments as described above are described by using the case, which is applied to the base station apparatus of the mobile communications system, as the example. As exemplified by the adaptive array system, the present embodiments can be applied to any communications device to output the signal changing the transmitting weight for each antenna.

The invention claimed is:

1. A communication apparatus comprising a calibration unit, a transmit-receive unit, and a plurality of antenna units coupled to each of the calibration unit and the transmit-receive unit, wherein:

the communication apparatus further comprises a calibration signal obtainer to obtain a calibration signal;

the calibration unit comprises a first transmitter to transmit the calibration signal obtained by the calibration signal obtainer to each of the antenna units;

each of the antenna units comprises a first obtainer/transmitter to obtain the calibration signal transmitted by the first transmitter and to transmit to the transmit-receive unit;

the transmit-receive unit comprises a first calibration weight basic amount calculator to calculate a first calibration weight basic amount based on the calibration signal transmitted by the first obtainer/transmitter and a second transmitter to transmit the calibration signal obtained by the calibration signal obtainer to each of the antenna units;

each of the antenna units further comprises a second obtainer/transmitter to obtain the calibration signal transmitted by the second transmitter and to transmit to the calibration unit;

the calibration unit further comprises a second calibration weight basic amount calculator to calculate a second calibration weight basic amount based on the calibration signal transmitted by the second obtainer/transmitter; and the communication apparatus further comprises a calibration weight calculator to calculate a calibration weight based on the first calibration weight basic amount and the second calibration weight basic amount.

2. The communication apparatus according to claim 1, wherein the transmit-receive unit comprises:

signal receivers, each installed in each of the plurality of antenna units and receiving signals arriving at each of the antenna units;

a receiving weight calculator to calculate a plurality of receiving weights respectively corresponding to the antenna units, each of the receiving weights showing an amount of difference of phase and amplitude of signals, which are received by each of the signal receiver, between the antenna units;

a transmitted signal obtainer to obtain a transmission signal;

a transmitting weight determiner to determine transmitting weights respectively corresponding to the antenna units, each of the transmitting weights showing an amount of difference of phase and amplitude of the transmission signal, which is transmitted from each of the antenna units, between the antenna units based on each of the receiving weights and each calibration weight calculated by the calibration weight calculator; and a plurality of transmission signal transmitters, each installed in each of the plurality of antenna units and transmitting the transmission signal, which is weighted based on the transmitting weight determined by the transmitting weight determiner, from each of the antenna units.

3. The communication apparatus according to claim 1 or 2, wherein the first calibration weight basic amount is calculated based on an amount of phase rotation and an amount of amplitude change of the calibration signal received by the transmit-receive unit from the calibration signal obtained by the calibration signal obtainer and the second calibration weight basic amount is calculated based on an amount of phase rotation and an amount of amplitude change of the calibration signal received by the calibration unit from the calibration signal obtained by the calibration signal obtainer.

4. The communication apparatus according to any one of claim 1 or 2, wherein the calibration signal is a constant frequency signal.

5. Calibration method for calculating a calibration weight of a communication apparatus comprising a calibration unit, a transmit-receive unit, and a plurality of antenna units coupled to each of the calibration unit and the transmit-receive unit, comprising:

a calibration signal obtaining step of obtaining a calibration signal;

a first transmitting step of transmitting the calibration signal obtained in the calibration signal obtaining step to each of the antenna units in the calibration unit;

a first obtaining/transmitting step of transmitting the calibration signal transmitted in the first transmitting step to the transmit-receive unit in each of the antenna units;

a first calibration weight basic amount calculating step of calculating a first calibration weight basic amount based on the calibration signal transmitted in the first obtaining/transmitting step and a second transmitting step of transmitting the calibration signal obtained in the calibration signal obtaining step to each of the antenna unit in the transmit-receive unit;

a second obtaining/transmitting step of transmitting the calibration signal transmitted in the second transmitting step to the calibration unit in each of the antenna units;

a second calibration weight basic amount calculating step of calculating a second calibration weight basic amount based on the calibration signal transmitted in the second obtaining/transmitting step in the calibration unit; and a calibration weight calculating step of calculating a calibration weight based on the first calibration weight basic amount and the second calibration weight basic amount.

* * * * *